United States Patent [19]

Sugino et al.

[11] Patent Number: 5,252,623

[45] Date of Patent: Oct. 12, 1993

[54] EXPANDABLE VINYL CHLORIDE RESIN COMPOSITION

[75] Inventors: Satoru Sugino, Yokkaichi; Hisaharu Hotta, Yokohama, both of Japan

[73] Assignees: Mitsubishi Kasei Vinyl Company; Mitsubishi Kasei Corporation, both of Tokyo, Japan

[21] Appl. No.: 6,495

[22] Filed: Jan. 21, 1993

[30] Foreign Application Priority Data

Jan. 21, 1992 [JP] Japan ................................ 4-8538

[51] Int. Cl.$^5$ .................................................. C08J 9/04
[52] U.S. Cl. ........................................ 521/73; 521/88; 521/90; 521/94; 521/137; 521/145; 521/149
[58] Field of Search ................ 521/94, 73, 88, 90, 521/137, 145, 149

[56] References Cited

U.S. PATENT DOCUMENTS

| | | | |
|---|---|---|---|
| 2,576,749 | 11/1951 | Carpentier | 521/94 |
| 3,200,089 | 8/1965 | Landler et al. | 521/145 |
| 3,256,217 | 6/1966 | Landler et al. | 521/145 |
| 3,267,051 | 8/1966 | Landler et al. | 521/145 |
| 3,283,043 | 11/1966 | Landler et al. | 521/145 |
| 3,290,262 | 12/1966 | LeClercq et al. | 521/145 |
| 4,028,449 | 6/1977 | Kakitani et al. | |
| 4,055,518 | 10/1977 | Kakitani et al. | |
| 4,839,218 | 6/1989 | Sugino et al. | |
| 5,030,673 | 7/1991 | Sugino et al. | |
| 5,087,664 | 2/1992 | Sugino et al. | |

FOREIGN PATENT DOCUMENTS 5244588 11/1977 Japan .

*Primary Examiner*—Morton Foelak
*Attorney, Agent, or Firm*—Oblon, Spivak, McClelland, Maier & Neustadt

[57] ABSTRACT

An expandable vinyl chloride resin composition comprising, as main components, a vinyl chloride polymer composed mainly of vinyl chloride obtained by emulsion polymerization or fine suspension polymerization of a vinyl chloride monomer and a vinyl comonomer having a hydroxyl group or a carboxyl group, a plasticizer, a chemical blowing agent and a crosslinking agent, wherein said crosslinking agent is:

(1) a combination of an alkylphenol-blocked polyisocyanate and an ε-caprolactam-blocked polyisocyanate, or (2) a polyisocyanate randomly blocked by an alkyl phenol and ε-caprolactam.

12 Claims, No Drawings

EXPANDABLE VINYL CHLORIDE RESIN COMPOSITION

BACKGROUND OF THE INVENTION

1. Field of the Invention

The present invention relates to an expandable vinyl chloride resin composition suitable for application as an interior material for automobiles or as a material for bags, and a crosslinked expanded product obtained from such a composition.

2. Discussion of Background

Inventions relating to crosslinkable highly expandable vinyl chloride resin compositions have been known as disclosed, for example, in Japanese Examined Patent Publications No. 16498/1977 and No. 44588/1977. However, crosslinking agents such as diisocyanates as disclosed in these inventions have their functional groups not blocked and have a drawback that they readily react with moisture or with other functional groups to loose the crosslinking properties as time passes during the storage of the compositions even at a low temperature. Therefore, such compositions are required to be molded immediately after the preparation, and it is difficult to store them for a long period of time or to mold them at an optional time. Even if the molding can be conducted, it is difficult to adjust the crosslinking and foaming speeds, and with the compositions which have been stored, the crosslinking reaction tends to be inadequate, and it has been difficult to constantly produce a highly expanded molded product. Further, these compositions have a drawback that for their molding, it is necessary to adopt a heating system of two steps of gelation (crosslinking) and foaming, and the process tends to be cumbersome.

SUMMARY OF THE INVENTION

The present inventors have conducted an extensive study to obtain a highly crosslinked and highly expanded molded product by a gelation step wherein crosslinking and foaming take place simultaneously and in good balance, and as a result, have found it possible to obtain a highly expanded molded product having a uniform cell structure, high compression strength and a smooth surface by using a polyisocyanate blocked with an alkylphenol and $\epsilon$-caprolactam, as a crosslinking agent. The present invention has been accomplished on the basis of this discovery. Further, it has been found that the molded product, such as a sheet, is substantially free from collapse of the cell structure or distortion of the wall thickness even when subjected to thermo forming including pressure forming and vacuum forming.

Namely, it is an object of the present invention to provide an expandable vinyl chloride resin composition which can be stored for a long period of time and which undergoes crosslinking and foaming simultaneously and in good balance by a single heating step, and a compression resistant highly expanded molded product obtained by shaping such a composition.

Thus, the present invention provides an expandable vinyl chloride resin composition comprising, as main components, a vinyl chloride polymer composed mainly of vinyl chloride obtained by emulsion polymerization or fine suspension polymerization of a vinyl chloride monomer and a vinyl comonomer having a hydroxyl group or a carboxyl group, a plasticizer, a chemical blowing agent and a crosslinking agent, wherein said crosslinking agent is:

(1) a combination of an alkylphenol-blocked polyisocyanate and an $\epsilon$-caprolactam-blocked polyisocyanate, or (2) a polyisocyanate randomly blocked by an alkyl phenol and $\epsilon$-caprolactam.

DETAILED DESCRIPTION OF THE PREFERRED EMBODIMENTS

Now, the present invention will be described in detail.

The vinyl chloride polymer as a resin component of the composition of the present invention is obtained by copolymerizing a vinyl chloride monomer with a comonomer having a hydroxyl group or a carboxyl group in its molecule. Specific examples of the comonomer include 2-hydroxyethyl acrylate, 2-hydroxyethyl methacrylate, 2-hydroxypropyl acrylate, 3-chloro-2-hydroxypropyl methacrylate, 3-hydroxybutyl acrylate, 4-hydroxybutyl acrylate, ethyl 2-hydroxyethyl fumalate, hydroxybutyl vinyl ether, methacrylic acid, acrylic acid, monobutyl maleate and undecylenic acid.

There is no particular restriction as to a method for producing the vinyl chloride polymer used in the present invention. However, such a polymer is preferably the one having a particle structure and a particle size distribution such that it forms a stabilized plastisol when mixed with a plasticizer. To obtain a polymer to satisfy such a condition, it is common to employ a conventional emulsion polymerization method or a fine suspension polymerization method. The comonomer to be copolymerized is contained preferably in an amount of from 0.5 to 10% by weight in the polymer.

The plasticizer as a component of the composition of the present invention is not particularly limited so long as it can be used for a vinyl chloride polymer. For example, phthalic acid plasticizers such as di-n-butyl phthalate, di-n-octyl phthalate, di-2-ethylhexyl phthalate (DOP), diisooctyl phthalate, octyldecyl phthalate, diisononyl phthalate, diisodecyl phthalate, butylbenzyl phthalate, octylbenzyl phthalate and di-2-ethylhexyl isophthalate; trimellitic acid plasticizers such as trioctyl trimellitate and triisodecyl trimellitate; fatty acid ester plasticizers such as di-2-ethylhexyl adipate (DOA), di-n-decyl adipate, di-isodecyl adipate, di-2-ethylhexyl azelate, dibutyl sebacate and di-2-ethylhexyl sebacate; phosphoric acid ester plasticizers such as tributyl phosphate, tri-2-ethylhexyl phosphate, 2-ethylhexyldiphenyl phosphate and tricresyl phosphate; a polyester plasticizer having a molecular weight of from 600 to 8,000 obtained from a dibasic acid and glycol; epoxyplasticizers such as epoxydized soybean oil and epolydized tall oil-2-ethylhexyl fatty acid, may be mentioned. These plasticizers may be used alone or in combination as a mixture of two or more of them.

The amount of the plasticizer is properly selected depending upon the desired solid content and the fluidity of the plastisol, the amount of the blowing agent and the application of the blowing agent. It is usually within a range of from 30 to 400 parts by weight, preferably from 40 to 200 parts by weight, per 100 parts by weight of the vinyl chloride polymer.

Further, a part of the plasticizer may be substituted by a diluent such as hexanol isobutylate or dodecylbenzene, or by an organic solvent capable of swelling the vinyl chloride polymer, such as toluene or xylene, so that the plasticizer will be in the form of an organo sol.

The amount of the diluent or the organic solvent is determined optionally depending upon the particular purpose.

The chemical blowing agent may be the one commonly employed. For example, azodicarbon amide, azobisisobutyronitrile, dinitrosopentamethylenetetramine, p-toluenesulfonylhydrazide or P.P'-oxybisbenzenesulfonylhydrazide may be mentioned. The amount of the blowing agent varies depending upon the desired degree of expansion. However, it is usually within a range of from 1 to 40 parts by weight, preferably from 5 to 20 parts by weight, per 100 parts by weight of the vinyl chloride polymer as the base material.

The composition of the present invention is characterized in that it contains a polyisocyanate blocked with an alkylphenol and $\epsilon$-caprolactam, as a crosslinking agent for the vinyl chloride polymer. The crosslinking agent may be a combination of an alkylphenol-blocked polyisocyanate and an $\epsilon$-caprolactam-blocked polyisocyanate, or a polyisocyanate randomly blocked by an alkylphenol and $\epsilon$-caprolactam i.e. a blocked product whereby an alkylphenol and $\epsilon$-caprolactam are co-existent in one molecule of polyisocyanate, or a mixture thereof.

The polyisocyanate includes various diisocyanate monomers, for example, an aliphatic diisocyanate such as hexamethylene diisocyanate or lysine diisocyanate, an alicyclic diisocyanate such as hydrogenated diphenyl methane diisocyanate, isophorone diisocyanate or hydrogenated tolylene diisocyanate, and an aromatic diisocyanate such as tolylene diisocyanate, diphenylmethane diisocyanate, naphthylene diisocyanate or xylene diisocyanate; urethane prepolymers and adducts having terminal NCO groups obtainable by the reaction of such diisocyanate monomers with polyols; and polyisocyanate polymers containing isocyanurate rings obtainable by polymerizing such diisocyanate monomers.

The polyols which constitute the above mentioned urethane prepolymers and adducts i.e. which react with diisocyanate monomers, include polyfunctional alcohols, for example, a glycol such as ethylene glycol, propylene glycol, neopentyl glycol, 1,2-dipropylene glycol, 1,3-buthanediol, 1,4-buthanediol, 2,3-buthanediol, hexamethylene glycol, 2,5-hexanediol, 2,2,4-trimethyl-1,3-penthanediol or 3-methyl-1,5-penthanediol, or a triol such as glycerol, trimethylolethane, trimethylolpropane or 1,2,6-hexanetriol; polymerization products or copolymerization products obtained by ring-polymerizing ethylene oxide, propylene oxide, $\epsilon$-caprolactam or $\beta$-methyl-$\delta$-valerolactone to such polyols; terminal hydroxy compounds obtainable by condensing such polyols with polybasic carboxylic acids; and acrylpolyols. These polyols may be used alone or in combination as a mixture.

The polyisocyanate polymers containing isocyanurate rings may be prepared by polymerizing the above-mentioned diisocyanate monomers in a plasticizer such as a phthalic acid ester, a phosphoric acid ester, an adipic acid ester or a trimellitic acid ester using a well known catalyst such as a tertiary amine, a Mannich base, an alkaline metal salt of a fatty acid or an alcoholate by a known method.

Among the above-mentioned polyisocyanates, it is particularly preferred to use a hexamethylene diisocyanate (HMDI) or isophorone diisocyanate (IPDI) monomer, or a prepolymer thereof with trimethylol propane (TMP) or with trimethylolpropane and a polyfunctional polypropylenepolyol, whereby the composition or the expanded product will not be yellowed.

For the production of a blocked product of polyisocyanate, it is preferred to react a polyisocyanate with an alkylphenol or $\epsilon$-caprolactam in a plasticizer. Such a plasticizer is required to be inert to an isocyanate group, and the above-mentioned commercially available plasticizer may be used for this purpose. Among them, a phthalic acid plasticizer such as dibutyl phthalate, di-2-ethylhexyl phthalate, diisononyl phthalate or an alkylbenzyl phthalate, or a trimellitic acid plasticizer such as trioctyl trimellitate, is particularly suitable.

There is no particular restriction as to the type of the alkylphenol as the blocking agent. However, it is usually a phenol having an alkyl group of at least 4 carbon atoms as a substituent. For example, butylphenol, hexylphenol, octylphenol or nonylphenol is preferred.

As the crosslinking agent for the composition of the present invention, the alkylphenol-blocked polyisocyanate and the $\epsilon$-caprolactam-blocked polyisocyanate are used in combination in proper proportions, or the polyisocyanate randomly blocked by predetermined proportions of an alkylphenol and $\epsilon$-caprolactam in one polyisocyanate molecule, is used, or a mixture thereof is used. The molar ratio of the alkylphenol to the $\epsilon$-caprolactam in the randomly blocked polyisocyanate is preferably within a range of from 2/1 to ½, more preferably from 1/1 to ½.

Thus, the amount of the crosslinking agent is usually from 2 to 5 parts by weight (as the blocked polyisocyanate) per 100 parts by weight of the vinyl chloride polymer. And, the molar ratio of the alkylphenol to the $\epsilon$-caprolactam used as the blocking agent in the crosslinking agent is preferably within a range of from 2/1 to ½, more preferably within a range of 1/1 to ½. Namely, in a case where polyisocyanates which are blocked by an alkylphenol and $\epsilon$-caprolactam, respectively, they are incorporated so that the respective amounts will fall within the above range.

If an alkylphenol-blocked product is used alone, when the resulting composition is heated after shaping, the crosslinking reaction rate is higher than the decomposition rate of the blowing agent, and foaming takes place in a state where the melt viscosity is high, whereby it is hardly possible to obtain a molded product having a good surface smoothness or to obtain a uniformly highly expanded product. On the other hand, if an $\epsilon$-caprolactam-blocked product is used alone, the crosslinking rate tends to be too low that the resulting foamed cell structure tends to be so large that foamed cells are likely to break, or it tends to be hardly possible to obtain a highly expanded product excellent in the compression resistance.

The expandable vinyl chloride resin composition of the present invention is shaped by such a method as slush molding, rotational molding, dip molding or casting, or coated and shaped on a substrate made of e.g. paper, fiber or steel by such a method as dip coating, knife coating, roll coating, curtain flow coating or air knife coating, followed by heating to obtain a highly crosslinked highly expanded molded product. In particular, a crosslinked expanded product obtained by coating and shaping, is useful as a thermo forming sheet.

Now, the composition of the present invention will be described in further detail with reference to Examples. However, it should be understood that the present invention is by no means restricted to such specific Examples.

The following five types of crosslinking agents (A to E) were employed for the compositions.

(A) A nonylphenol/ε-caprolactam (molar ratio of about ½) random block product of a IPDI/TMP-trifunctional polypropylenepolyol prepolymer (hereinafter referred to simply as a polyisocyanate)

(B) A nolylphenol/ε-caprolactam (molar ratio of about ½) randomly blocked product of the polyisocyanate (C) A nonylphenol blocked product of the polyisocyanate (D) An ε-caprolactam-blocked product of the polyisocyanate (E) A tolylene diisocyanate monomer Preparation of crosslinking agents Preparation of crosslinking agent (A)

(a) Preparation of the polyisocyanate 1,000.35 g (4.5 mols) of IPDI and 1,501.78 g of DOP were mixed, and 3.34 g of dibutyltin dilaurate was added thereto. The mixture was heated to 50° C. and dissolved. Solution I On the other hand, 134.17 g (1 mol) of TMP, 200 g (0.5 mol) of tri-functional polypropylenepolyol (molecular weight: 400) and 500 g of DOP were mixed and heated to a temperature of from 60° to 70° C. to dissolve TMP. Solution II While maintaining the temperature of Solution I at a level of 50°±5° C., Solution II was dropwise added, whereby a urethane-forming reaction is conducted under gradual temperature drop. When the theoretical NCO content reached 5.66% by weight, the reaction was terminated.

(b) Blocking reaction 336.4 g (2.97 mols) of ε-caprolactam and 1,009.2 g of DOP were mixed and heated to dissolve ε-caprolactam. To this solution, 336.4 g (1.53 mols) of nonylphenol was added, and the mixture was added all at once to the above polyisocyanate prepared in step (a) to conduct the blocking reaction of the isocyanate groups (NCO groups). The temperature for the reaction and aging was 60°±5° C.

The reaction was terminated when absorption by NCO groups (2,270 cm$^{-1}$) in the infrared spectrum was no longer observed.

Preparation of crosslinking agent (B)

The crosslinking agent was prepared in the same manner as in the preparation of crosslinking agent (A) except that in the blocking reaction for the preparation of crosslinking agent (A), the amounts of ε-caprolactam, nonylphenol and DOP were changed to 405.1 g (3.58 mol) of ε-caprolactam, 202.4 g (0.92 mol) of nonylphenol and 911.25 g of DOP.

Preparation of crosslinking agent (C)

The crosslinking agent was prepared in the same manner as in the preparation of crosslinking agent (A) except that in the blocking reaction for the preparation of crosslinking agent (A), the blocking agent and its amount were changed to 992 g (4.5 mols) of nonylphenyl, and the amount of DOP was changed to 1,485 g.

Preparation of crosslinking agent (D)

The crosslinking agent was prepared in the same manner as in the preparation of crosslinking agent (A) except that in the blocking reaction for the preparation of crosslinking agent (A), the blocking agent and its amount were changed to 509.22 g (4.5 mols) of ε-caprolactam, and the amount of DOP was changed to 763.83 g.

Further, the physical properties of the crosslinked expanded products were evaluated as follows.

1. Quality of the expanded products
    (i) Expanded cell structure: The cross section of the expanded product was visually observed.
    (ii) Surface smoothness: The surface of the expanded product was visually observed.
    (iii) Degree of expansion: The ratio of the thickness of the expanded product to the thickness of the non-expanded gelated sheet.
2. Crosslinked ratio: Percentage of the tetrahydrofuran-insoluble content by weight of the expanded product in the vinyl chloride polymer.
3. Compression resistance: The expanded product was pressed with a finger, and the resilience was evaluated as being felt.
4. Thermo forming property: A felt substrate coated with an adhesive was placed on a male mold having a concave and a convex, and a crosslinked expanded sheet was heated on the felt substrate at a temperature of about 170° C. Then, the thermo forming was conducted by vacuuming the felt side to integrate the sheet and the felt, whereupon the presence or absence of rapture of the sheet, nonuniformity in the wall thickness at e.g. a corner portion, the flatness and smoothness at a flat portion, etc. were totally evaluated.

EXAMPLES 1 TO 4 AND COMPARATIVE EXAMPLES 1 TO 3

The following composition was mixed by a Hobert mixer to obtain an expandable vinyl chloride resin composition (plastisol).

TABLE 1

| | |
|---|---|
| Vinyl chloride/ 2-hydroxypropylacrylate copolymer (content of 2-hydroxypropylacrylate: 3% by weight) | 100 parts by weight |
| DOP | 60 parts by weight |
| Barium-zinc type stabilizer | 3 parts by weight |
| Azodicarbon amide | 7 parts by weight |
| Crosslinking agent (solid content) | 4 parts by weight |

(But, crosslinking agent E was used in an amount of 3 parts by weight.)

On a non-expanded vinyl chloride sheet gelated having a thickness of 0.3 mm formed on a release paper, the above-mentioned plastisol was coated in a thickness of 0.2 mm by knife coating, followed by heating at 210° C. for two minutes for crosslinking and foaming. The release paper was peeled off to obtain a crosslinked expanded sheet for thermo forming. The physical properties of this sheet are shown in Table 2.

TABLE 2

|  | Examples | | | | Comparative Examples | | |
| --- | --- | --- | --- | --- | --- | --- | --- |
|  | 1 | 2 | 3 | 4 | 1 | 2 | 3 |
| Crosslinking agent | A | B | C/D | C/D | C | D | E |
| Molar ratio |  |  | ½ | ½ |  |  |  |
| Expansion properties |  |  |  |  |  |  |  |
| Expanded cell structure | Good | Good | Good | Good | Elongated, irregular | Good | Poor |
| Surface smoothness | Good | Good | Good | Good | Poor Very irregular | Fair | Poor |
| Degree of expansion (times) | 11 | 11 | 11 | 11 | 10 | 12 | Not measurable |
| Crosslinked ratio (%) | 85 | 75 | 88 | 85 | 88 | 70 | 80 |
| Compression resistance | Good | Good | Good | Good | Good | Poor | Good |
| Thermo forming property | Good | Good | Good | Good | Poor Irregular surface | Poor Non-uniform wall-thickness | — |

In Examples 1 to 4, compression resistance of the expanded products was good, no collapse of cells or no rapture or uneven wall thickness of the sheet was observed in the thermo forming, and the crosslinking reaction and foaming took place in good balance by a single step of heating. On the other hand, in Comparative Examples 1 and 3, it was impossible to obtain a foamed sheet having a smooth surface, and obtained was a sheet which could not be used for thermo forming. Further, in Comparative Example 2, the crosslinking reaction was inadequate, whereby non-uniformity in the wall thickness or the like resulted at the time of thermo forming.

The expandable vinyl chloride resin composition of the present invention has such an effect that by blocking the polyisocyanate used as a crosslinking agent with an alkylphenol and ε-caprolactam, the foaming and crosslinking reactions take place in good timing and in good balance of the reaction rates, whereby a highly crosslinked highly expanded molded product can readily and constantly be produced with good thermo formability by a single step of heating. Thus, its value for industrial application is very high. Further, the composition of the present invention can be stored by itself for a long period of time.

What is claimed is:

1. An expandable vinyl chloride resin composition comprising, as main components, a vinyl chloride polymer composed mainly of vinyl chloride obtained by emulsion polymerization or fine suspension polymerization of a vinyl chloride monomer and a vinyl comonomer having a hydroxyl group or a carboxyl group, a plasticizer, a chemical blowing agent and a crosslinking agent, wherein said crosslinking agent is:

(1) a combination of an alkylphenol-blocked polyisocyanate and an ε-caprolactam-blocked polyisocyanate, or (2) a polyisocyanate randomly blocked by an alkyl phenol and ε-caprolactam.

2. The expandable vinyl chloride resin composition according to claim 1, wherein the vinyl comonomer is at least one member selected from the group consisting of 2-hydroxyethyl acrylate, 2-hydroxyethyl methacrylate, 2-hydroxypropyl acrylate, 3-chloro-2-hydroxypropyl methacrylate, 3-hydroxybutyl acrylate, 4-hydroxybutyl acrylate, ethyl-2-hydroxyethyl fumalate and hydroxybutyl vinyl ether.

3. The expandable vinyl chloride resin composition according to claim 1 or 2, wherein the content of the comonomer in the vinyl chloride polymer is from 0.1 to 10% by weight.

4. The expandable vinyl chloride resin composition according to claim 1, wherein the polyisocyanate is a diisocyanate monomer, a urethane prepolymer or adduct having terminal NCO groups, or a polyisocyanate polymer containing an isocyanurate ring.

5. The expandable vinyl chloride resin composition according to claim 1 or 4, wherein the polyisocyanate is hexamethylene diisocyanate or isophorone diisocyanate, or a prepolymer thereof with trimethylol propane or with trimethylol propane and a polyfunctional polypropylenepolyol.

6. The expandable vinyl chloride resin composition according to claim 1, wherein the alkylphenol is a phenol having an alkyl group of at least 4 carbon atoms as a substituent.

7. The expandable vinyl chloride resin composition according to claim 1, wherein the molar ratio of the alkylphenol to the ε-caprolactam is from 2/1 to ½.

8. The expandable vinyl chloride resin composition according to claim 1, which comprises 100 parts by weight of the vinyl chloride polymer, from 30 to 400 parts by weight, of the plasticizer, from 1 to 40 parts by weight, of the chemical blowing agent, and from 2 to 5 parts by weight of the crosslinking agent.

9. A crosslinked vinyl chloride resin foam obtained by shaping and heating the expandable vinyl chloride resin composition as defined in claim 1 or 8.

10. The crosslinked vinyl chloride resin foam according to claim 9, which is a thermo forming sheet.

11. The expandable vinyl resin composition according to claim 7, wherein the molar ratio of the alkylphenol to the ε-caprolactam is 1/1 to ½.

12. The expandable vinyl resin composition according to claim 8 which comprises 100 parts by weight of vinyl chloride polymer, 40 to 200 parts by weight, of the plasticizer, from 5 to 20 parts by weight, of the chemical blowing agent and from 2 to 5 parts by weight of the crosslinking agent.

* * * * *